(12) United States Patent
Kazadi

(10) Patent No.: US 8,149,079 B2
(45) Date of Patent: Apr. 3, 2012

(54) MAGNETICALLY LEVITATED MOUNT

(76) Inventor: Sanza Nkashama Tshilobo Kazadi, Alahmbra, CA (US)

(*) Notice: Subject to any disclaimer, the term of this patent is extended or adjusted under 35 U.S.C. 154(b) by 161 days.

(21) Appl. No.: 12/636,711

(22) Filed: Dec. 12, 2009

(65) Prior Publication Data

US 2011/0140819 A1    Jun. 16, 2011

(51) Int. Cl.
    *H01F 7/02*    (2006.01)
(52) U.S. Cl. ........ 335/306; 335/284; 335/299; 335/296; 335/302
(58) Field of Classification Search ........... 335/209–306
    See application file for complete search history.

(56) References Cited

U.S. PATENT DOCUMENTS

| | | | | |
|---|---|---|---|---|
| 3,977,739 A * | 8/1976 | Moskowitz et al. | ........... | 384/446 |
| 4,040,681 A * | 8/1977 | van der Heide | .............. | 310/90.5 |
| 4,382,245 A * | 5/1983 | Harrigan | ....................... | 335/306 |
| 5,099,216 A * | 3/1992 | Pelrine | .......................... | 335/220 |
| 5,182,533 A * | 1/1993 | Ritts | ............................. | 335/306 |
| 5,404,062 A * | 4/1995 | Hones et al. | ................. | 310/90.5 |
| 5,506,459 A * | 4/1996 | Ritts | ............................. | 310/90.5 |
| 5,584,367 A * | 12/1996 | Berdut | ........................... | 188/267 |
| 5,589,721 A * | 12/1996 | Han et al. | ...................... | 310/90.5 |
| 5,825,105 A * | 10/1998 | Barber et al. | .............. | 310/12.31 |
| 5,895,018 A * | 4/1999 | Rielo | ........................... | 248/206.5 |
| 6,318,899 B1 * | 11/2001 | Boyd | ............................ | 384/492 |
| 6,402,118 B1 * | 6/2002 | Nijsse et al. | ................... | 248/550 |
| 6,413,138 B1 * | 7/2002 | Dokoupil | ....................... | 446/129 |
| 6,448,679 B1 * | 9/2002 | Imlach | .......................... | 310/90.5 |
| 6,554,480 B2 * | 4/2003 | Ishiguro et al. | ............... | 384/516 |
| 6,781,270 B2 * | 8/2004 | Long | ............................ | 310/90.5 |
| 6,838,967 B2 * | 1/2005 | Martin | .......................... | 335/306 |
| 6,879,127 B2 * | 4/2005 | Gery | ............................. | 318/649 |
| 6,920,870 B2 * | 7/2005 | Minica et al. | ................. | 124/44.5 |
| 6,971,507 B2 * | 12/2005 | Forman | ......................... | 198/805 |
| 7,501,922 B2 * | 3/2009 | Kazadi | .......................... | 335/306 |
| 2003/0176144 A1* | 9/2003 | Fisher et al. | .................. | 446/133 |
| 2005/0126554 A1* | 6/2005 | Minica et al. | ................. | 124/44.5 |
| 2006/0044094 A1* | 3/2006 | Davis et al. | ................... | 335/220 |

* cited by examiner

*Primary Examiner* — Anh Mai
*Assistant Examiner* — Bernard Rojas

(57) ABSTRACT

A levitating mount apparatus is provided which utilizes a permanent magnetic male and female levitation support as described in U.S. Pat. No. 7,501,922. The mount has two general forms. In one general class, the mount is attached to an axle aligned with the axis of symmetry of the female part of the permanent magnetic male and female levitation support. In the second class, the female part of the permanent magnetic male and female levitations support is attached to the bottom of the mount, and no axle is utilized. The mount is stabilized using a stationary support structure which has limited contact with the levitating portion of the apparatus at the top of the mount.

7 Claims, 2 Drawing Sheets

MAGNETICALLY LEVITATED MOUNT

FIELD OF THE INVENTION

This invention relates to the mounting of items and devices to an unpowered magnetically levitated support.

SUMMARY OF THE PRIOR ART

Citations

| U.S. Patent Documents | | |
|---|---|---|
| 3,196,566 | July 1965 | Littlefield |
| 4,486,729 | December 1984 | Lee |
| 4,901,456 | February 1990 | Cotutsca |
| 5,692,329 | December 1997 | Tang |
| 7,501,922 | March 2009 | Kazadi |

Magnetic levitation has been well studied for over two hundred years. It was recognized in 1842 with the publication of Earnshaw's Theorem that magnetic levitation due only to forces produced by the interaction of permanent magnets is not possible. Since that time, many products have been developed to exploit magnetic repulsion, giving the illusion that they are levitating freely. Many other devices have been developed which use magnetic fields to support part or all of an existing apparatus so as to mitigate the forces otherwise on the device.

Several devices exist in the literature that are intended to give the illusion of free levitation. Among these is a display due to John Littlefield (U.S. Pat. No. 3,196,566) which utilized a clever organization of magnets in a stationary base and a levitated aircraft together with a tethering string to give the illusion that the aircraft was flying. The problem with this device is that it is very limited in its capabilities, and cannot be generalized to other uses.

A second kind of magnetic levitation is disclosed in U.S. Pat. No. 4,901,456. This levitates a displayed item within a frame utilizing the attraction of magnets. The item is held by a filament from the bottom of the frame and attached to a magnet that attracts a second one at the top of the frame. The combination of attraction and pull on the filament stabilizes and immobilizes the device. The objects must be held down by the filament, which severely limits the motion of the displayed item. Moreover, any ferromagnetic material being displayed has the potential to affect the performance of the device.

Many devices exist in the literature which utilize electromagnetic fields to stabilize slowly rotating or stationary objects levitated using permanent magnets. An example of this is the levitating picture frame (U.S. Pat. No. 5,692,329). This uses a combination of permanent magnets and electromagnets to levitate and stabilize a picture frame, rotating it at will in one or the other direction at variable speeds. The need for a powered electromagnet to stabilize the system is a limitation, as is the potential disruption to ferromagnetic materials that might be placed in the picture display.

An improvement over the use of electromagnet technology is herein provided. The technology that makes this invention possible, described in U.S. Pat. No. 7,501,922, is a permanent magnetic male and female levitation support. This support makes it possible to create an axle which has one end supported by a permanent magnetic field and the other held in place by a rigid frame at one point of contact. This axle may be laden with a payload which is fully supported by the magnetic field. The axle automatically restores its position after perturbations that tend to misalign it. Affixing a mount to the axle, either to a real axle, or using a rigid mount that allows for the effect of having an axle, allows items to be displayed, stored, utilized in a stable manner with control that does not require external power sources and does not pose a threat to any devices that may be stored.

SUMMARY OF THE INVENTION

The present invention is a stationary magnetically levitated mount capable of holding objects for display and/or holding objects that may be utilized actively. The stationary magnetically levitated mount is capable of rotating with the objects, allowing various views of the object and also exposing the object to various views of the immediately surrounding area. The stationary magnetically levitated mount utilizes a permanent magnetic male and female support, as described in U.S. Pat. No. 7,501,922. This allows the mount to be fully supported by the magnetic field, thereby mitigating any frictional forces that might result from the weight of the central axis. Because the axle supporting the mount is levitated above a magnetic base, it does not require ball bearings or bearing assemblies, thereby reducing the cost and complexity of the mount.

In one instantiation, the mount surrounds a central axle which holds the female part and contacts with the stationary part of the support. Objects are then placed inside the mount or attached to the exterior of the mount. The mount rotates around the axis of the central axle. This arrangement allows the mount to rotate around the central axle, exposing the objects to various locations around the mount.

In another instantiation, no central axle is provided. In this instantiation, a cavity with the female part of the magnetic levitation supports is fitted in the bottom of a cavity. Objects may be placed in the cavity, and displayed or utilized from the interior of the cavity. The cavity and the stationary part of the apparatus connect in such a way that the cavity may rotate completely or partially around the central axis of the levitation supports.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
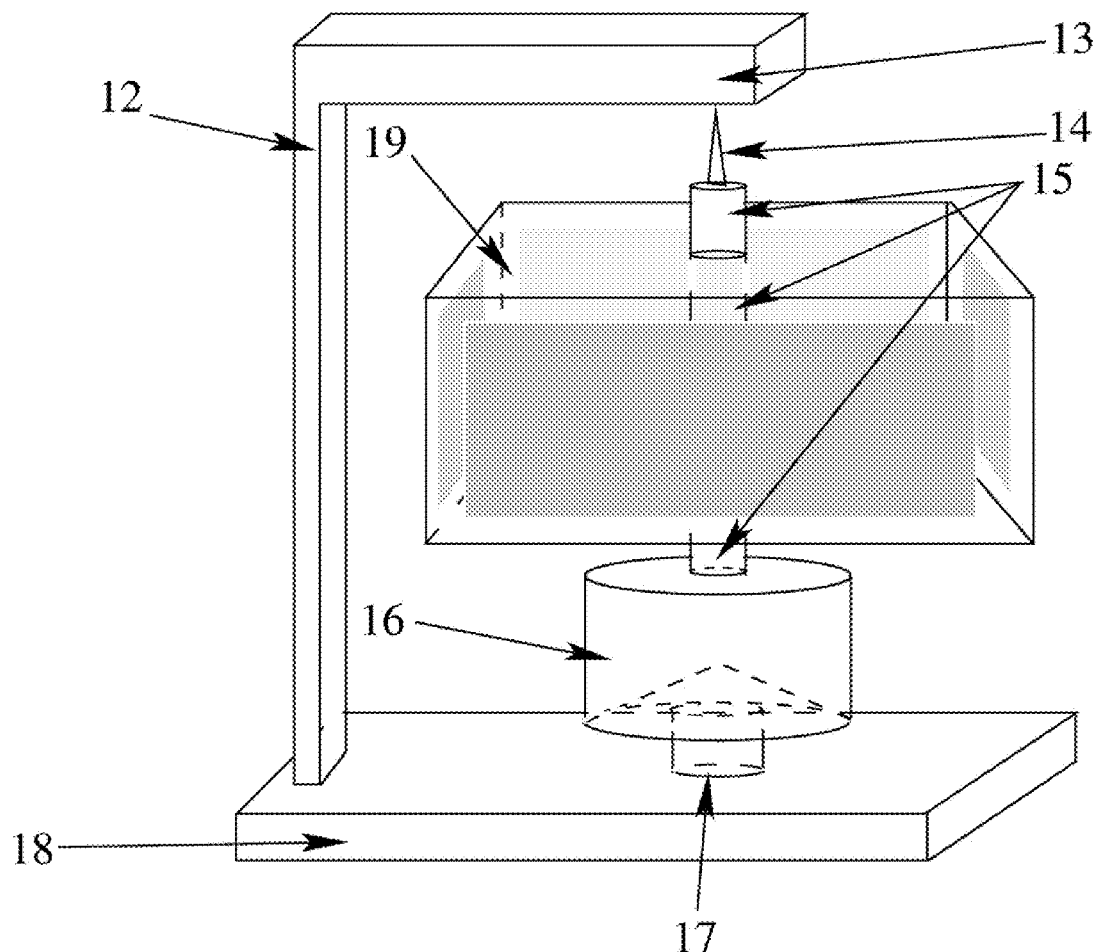
FIG. 1 is a version of the apparatus with the mount attached to a vertical axle attached to the female part of the permanent magnetic male and female levitation support and aligned with said female part's axis of symmetry.
Figure 2:
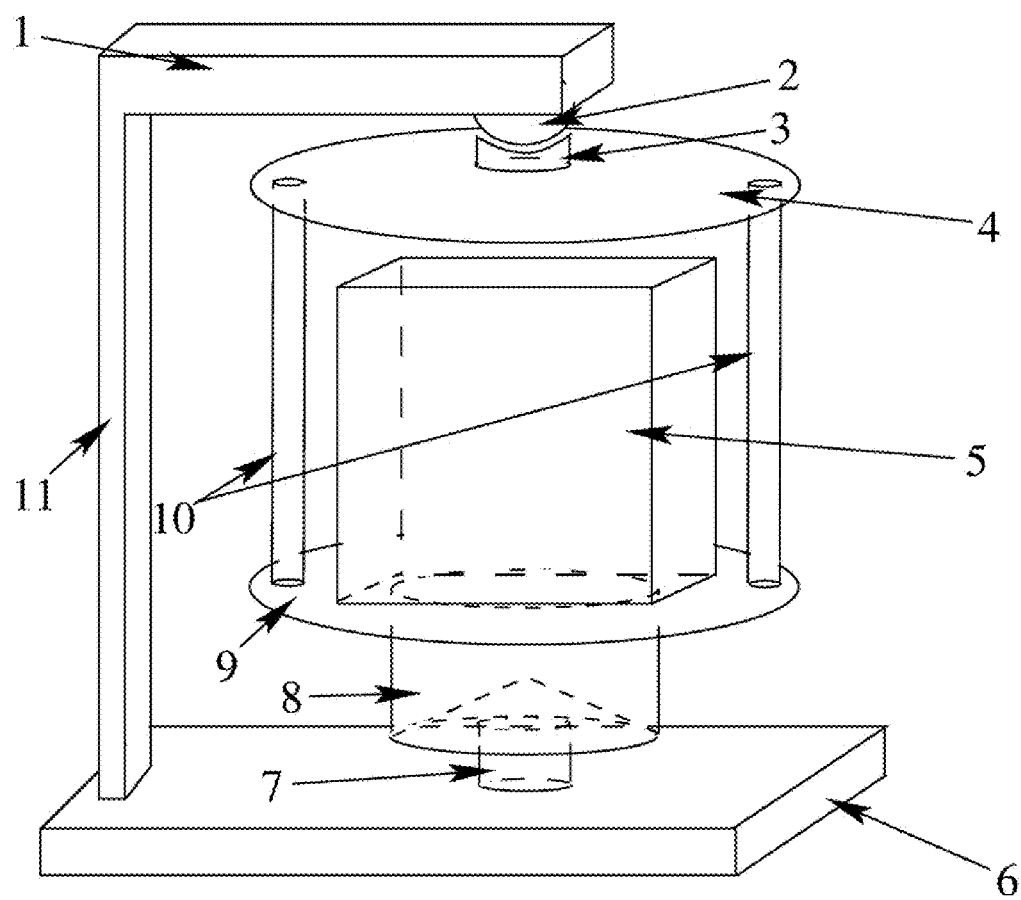
FIG. 2 is a version of the apparatus with the female part of the permanent magnetic male and female levitation support attached to the bottom of the mount. This version does not have a vertical axle and can hold objects that fill the mounting area.

As shown in FIGS. 1 and 2 for purposes of illustration, the present invention is a magnetically levitating apparatus capable of mounting items for display or for active use.

The first embodiment comprises three principle components:
(1) A rigid stationary support structure (12,13, and 18)
(2) A magnetically levitated axle structure (14, 15, 16, and 17)
(3) A display apparatus attached to said axle (19)

The rigid stationary support structure (12, 13, and 18) is a structure holding the male part (17) of the permanent magnetic male and female levitation support rigidly in place with respect to the remainder of the structure as well as providing a stationary point or structure for the topmost part of the magnetically levitated axle to contact. Enough space exists between the two parts of the support structure to allow rotation of the axle structure, though the rotation may be constrained by the same support structure.

The magnetically levitated axle structure (14, 15, 16, and 17) consists of a permanent magnetic male and female levitation support (as described in U.S. Pat. No. 7,501,922) and an attached axle aligned with the axis of symmetry of the female part of the permanent magnetic male and female levitation support (16). The male part (16) of the permanent magnetic male and female levitation support is rigidly attached to the support structure of the apparatus. The topmost portion of the axle (14) contacts the support structure in such a way that it is constrained to contact at one or more stationary points and that it is possible for the axle to rotate in part or completely about that point or points.

The mount (19) is attached to the axle structure in such a way that its entire weight is supported the axle, and arranged in such a way that it does not impede the rotation of the axle about the stationary point or points of contact with the rigid support structure. The mount holds one or more objects by some means rigidly.

In another embodiment illustrated in FIG. 2, the female part (8) of the permanent magnetic male and female levitation support is attached to the bottom of the mount (3, 4, 9, and 10). The object or objects held by the mount (5) may be placed within the mount. The top of the mount is fitted with an apparatus to contact the rigid stationary support structure (1, 6, and 11). The rigid stationary support structure has an attached device (2) which connects with the mount, and allows rotation of the levitating portion of the apparatus while providing vertical and lateral stabilization.

The invention claimed is:

1. A permanent magnetic levitation display apparatus comprising:
    a stationary and rigid support structure;
    a magnetically levitated axle comprising a male and a female part, said female part of said magnetically levitated axle having a cavity, a first axis extending through the center of the cavity, and a plurality of first permanent magnets distributed about a perimeter of the cavity producing a first magnetic field, and said male part of said magnetically levitated axle producing a second rotationally invariant magnetic field around a second axis;
    said male part of said permanent magnetic male and female levitation support being held in place on said stationary and rigid support structure;
    a display apparatus attached rigidly to the top of said female part of said magnetically levitated axle;
    said first part of said magnetically levitated axle and said display apparatus held in place by said stationary and rigid support through contact between said display and said stationary and rigid support structure at one or more points on said first stationary and rigid support structure, the rigid attachment to said female part of said magnetically levitated axle, and the interaction of the magnetic fields produced by said male and said female parts of said magnetically levitated axle;
    wherein when said first axis of said magnetically levitated axle is at least partially aligned with said second axis, and said first magnetic field of said magnetically levitated axle and said second magnetic field of said magnetically levitated axle simultaneously produce a repulsive force and a restorative force to levitate said first part of said magnetically levitated axle and said display apparatus relative to said second part and to at least partially align said first axis of said magnetically levitated axle with said second axis of said magnetically levitated axle;
    wherein said female part of said magnetically levitated axle and said display may rotates when acted on by an external torque, maintaining their orientation relative to one another, contact with said stationary and rigid support structure, and separation of the male and female parts of said magnetically levitated axle.

2. The mount of claim 1 wherein said display is designed to hold other objects.

3. The mount of claim 1 wherein said display contains a third set of magnets arranged in such a way that the magnetic fields of said third set of magnets do not interact with the magnetic fields of said magnetically levitated axle.

4. The mount of claim 3 wherein said stationary and rigid support structure contains a fourth magnet or set of magnets whose field or fields are arranged so as to interact with said third set of magnets on said display apparatus.

5. The mount of claim 4 wherein said stationary and rigid support structure contains a motor or other device capable of actuating said fourth magnet or set of magnets so that said fourth magnet or set of magnets rotates around a third axis which is stationary relative to said stationary and rigid support structure.

6. The mount of claim 5 wherein said rotation of said fourth magnet or set of magnets induces a rotation of said display apparatus and said rigidly attached first part of said magnetically levitated axle.

7. The mount of claim 5 wherein said actuating method utilizes a source of power derived from a renewable source such as solar, thermal, vibrational, wave powered, sound powered, or any other source that does not require delivery of power through chemical means or any means derived from external power generation.

* * * * *